J. MEYER.
EGG OPENER.
APPLICATION FILED JUNE 3, 1913.
1,087,805.
Patented Feb. 17, 1914.
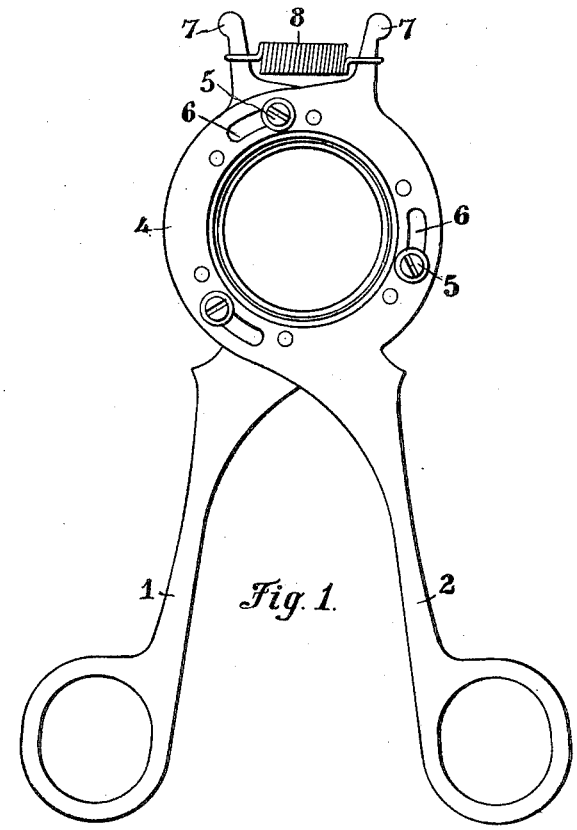
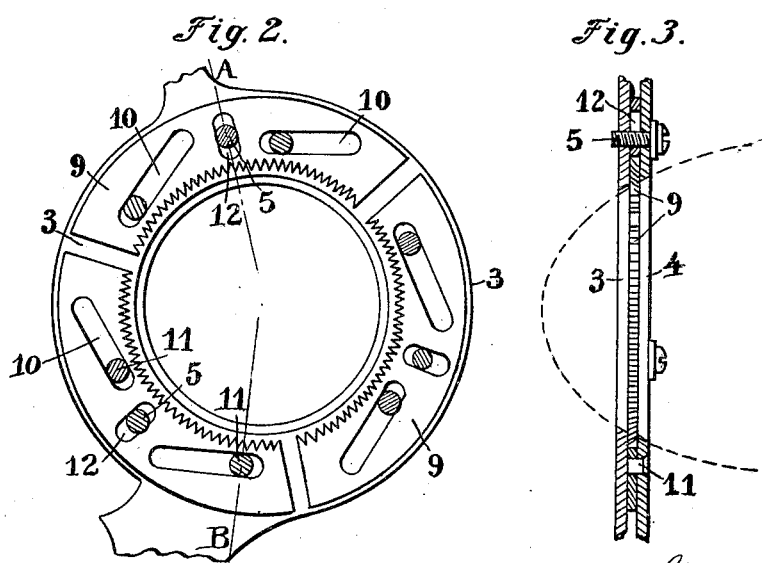

UNITED STATES PATENT OFFICE.

JOHAN MEYER, OF ZURICH, SWITZERLAND.

EGG-OPENER.

1,087,805.  Specification of Letters Patent.  Patented Feb. 17, 1914.

Application filed June 3, 1913. Serial No. 771,456.

*To all whom it may concern:*

Be it known that I, JOHAN MEYER, a subject of the King of Denmark, residing at 29 Zeughausstrasse, Zurich, Switzerland, have invented certain new and useful Improvements in Egg-Openers; and I do hereby declare the following to be a full, clear, and exact description of the invention, such as will enable others skilled in the art to which it appertains to make and use the same, reference being had to the accompanying drawings, and to letters or figures marked thereon, which form a part of this specification.

The subject matter of this invention is an appliance to be used for opening eggs and it is furnished with toothed ring segments which are capable of radial displacement with regard to each other and adapted to be pressed into the shell of the egg. The teeth only break the shell and thus detach a cap from the egg shell without injuring the soft part of the egg.

In the accompanying drawings an egg opener according to my invention is illustrated by way of example.

Figure 1 is a plan view of same. Fig. 2 shows the arrangement of the cutting segments, and Fig. 3 is a section on line A—B of Fig. 2.

According to these drawings the egg opener essentially consists of two rings 3, 4 having looped handles 1 and 2. Pins or screws 5 are fixed to the ring 3 and project through slots 6 in the ring 4. Each of the rings has furthermore an arm 7 extending from it, both these arms are normally drawn toward each other by means of a spring 8 and thereby maintain the position of the parts which is shown in Figs. 1 and 2. Three ring segments 9 are positioned between the rings 3 and 4, which segments are provided with teeth along their inner edges. Each of the segments has two oblique slots 10 through which pins 11 of the rings 3 and 4 project. Each of the segments is also provided with a radial slot 12 in which pins or screws 5 are adapted to move.

The slots 10 are tangentially arranged, thus, when the handles 1 and 2 are pressed toward each other, the segments are moved inwardly in a radial direction, whereby the teeth come to project over the inner edges of the rings 3 and 4 for a distance corresponding to the thickness of an egg shell. When placing the instrument over an egg so that the latter projects through the rings 3 and 4 as shown by the dotted lines in Fig. 3, and the handles of the instrument are pressed, the toothed segments will detach a cap from the egg shell without injury to the soft parts of the egg as the teeth of the segments do not enter the egg beyond the shell. The cap which has thus been severed from the egg can easily be taken off. The appliance can advantageously be used for raw eggs as well as for boiled eggs. If desired, the spring 8 may be omitted and the parts 3 and 4 can be so connected to each other as to be easily taken apart for cleaning and the like purposes.

What I claim is:

An egg-opener comprising in combination two rings, pins fixed to one ring and projecting through slots in the other ring, a spring between said rings, segments arranged between said rings having teeth on their inner side, two oblique slots in each of said segments through which said pins pass, a radial slot in each of said segments, a guide pin projecting in the said radial slot substantially as shown and for the purpose set forth.

In testimony whereof I affix my signature in presence of two witnesses.

JOHAN MEYER.

Witnesses:
AUGUST RÜEGG,
HARRY A. MCBRIDE.